United States Patent
Alsubaei et al.

(10) Patent No.: US 12,393,663 B1
(45) Date of Patent: Aug. 19, 2025

(54) VIBRATION AIDED PICTURE-BASED AUTHENTICATION SYSTEM AND METHOD

(71) Applicant: UNIVERSITY OF JEDDAH, Jeddah (SA)

(72) Inventors: Faisal Sultan Alsubaei, Jeddah (SA); Abdullah Eid Abuhussein, St. Cloud, MN (US)

(73) Assignee: UNIVERSITY OF JEDDAH, Jeddah (SA)

( * ) Notice: Subject to any disclaimer, the term of this patent is extended or adjusted under 35 U.S.C. 154(b) by 0 days.

(21) Appl. No.: 19/024,866

(22) Filed: Jan. 16, 2025

(51) Int. Cl.
*G06F 21/36* (2013.01)

(52) U.S. Cl.
CPC .................................. *G06F 21/36* (2013.01)

(58) Field of Classification Search
CPC ....................................................... G06F 21/36
See application file for complete search history.

(56) References Cited

U.S. PATENT DOCUMENTS

| | | | |
|---|---|---|---|
| 5,559,961 A | 9/1996 | Blonder | |
| 9,930,034 B2* | 3/2018 | Ekambaram | H04W 12/33 |
| 10,877,560 B2* | 12/2020 | Friedman | G06Q 30/0601 |
| 11,868,534 B1* | 1/2024 | Michaelis | G06F 3/016 |
| 2008/0235788 A1* | 9/2008 | El Saddik | G06F 21/36 |
| | | | 726/18 |
| 2014/0059674 A1* | 2/2014 | Sun | G06F 21/44 |
| | | | 726/19 |
| 2018/0224989 A1* | 8/2018 | Deasy | G06F 3/0233 |
| 2023/0116384 A1* | 4/2023 | Ramadhane | G06F 21/31 |
| | | | 726/19 |

OTHER PUBLICATIONS

Kamarushi MV, Watson SL, Tigwell GW, Peiris RL. OneButtonPIN: A single button authentication method for blind or low vision users to improve accessibility and prevent eavesdropping. Proceedings of the ACM on Human-Computer Interaction. Sep. 20, 2022;6(MHCI):1-22. (Year: 2022).*

(Continued)

*Primary Examiner* — James R Turchen
(74) *Attorney, Agent, or Firm* — PATENT PORTFOLIO BUILDERS PLLC

(57) ABSTRACT

A method performed by a server for authentication at a service provider includes generating a sequence X of secret locations $SL_n$ and deceiving locations $DL_k$ associated with an image, wherein the deceiving locations $DL_k$ are associated with a random array $V_i$ of vibrations pattern, wherein i, n, and k are integers with k smaller than n, and granting access to an electronic device to the server when taps received from the electronic device, and associated with the secret locations $SL_n$ and the deceiving locations $DL_k$, correspond to the sequence X. Each vibration of the random array $V_i$ of vibrations pattern is associated with a corresponding deceiving location $DL_k$.

12 Claims, 11 Drawing Sheets

(56) References Cited

OTHER PUBLICATIONS

Chakraborty N, Anand SV, Randhawa GS, Mondal S. On designing leakage-resilient vibration based authentication techniques. In2016 ieee trustcom/bigdatase/ispa Aug. 23, 2016 (pp. 1875-1881). IEEE. (Year: 2016).*

A. S. Gokhale and V. S. Waghmare, "The Shoulder Surfing Resistant Graphical Password Authentication Technique," Procedia Comput. Sci., vol. 79, pp. 490-498, Dec. 2016, doi: 10.1016/j.procs.2016.03.063.

A. Syukri, E. Okamoto, and M. Mambo, "A User Identification System Using Signature Written with Mouse.," Jan. 1998, pp. 403-414. doi: 10.1007/BFb0053751.

A. Vaddeti, D. Vidiyala, V. Puritipati, R. Ponnuru, J. Shin, and A. Reddy, "Graphical passwords: Behind the attainment of goals," Secur. Priv., vol. 3, Tadepalligudem India, Jul. 2020, doi: 10.1002/spy2.125.

F. Gondesen, M. Marx, and A.-C. Kycler, "A Shoulder-Surfing Resistant Image-Based Authentication Scheme with a Brain-Computer Interface," in 2019 International Conference on Cyberworlds (CW), Oct. 2019, pp. 336-343. doi: 10.1109/CW.2019.00061.

G. W. Bin, S. Safdar, R. Akbar, and S. Subramanian, "Graphical authentication based on anti-shoulder surfing mechanism," in Proceedings of the 2nd International Conference on Future Networks and Distributed Systems, New York, NY, USA, Jun. 2018, doi: 10.1145/3231053.3231073.

H. Gao, X. Liu, S. Wang, H. Liu, and R. Dai, "Design and Analysis of a Graphical Password Scheme," Xidian University, Shaanxi China, Jan. 2010, doi: 10.1109/ICICIC.2009.158.

I. Jermyn, A. Mayer, F. Monrose, M. K. Reiter, and A. D. Rubin, "The design and analysis of graphical passwords," in Proceedings of the 8th conference on USENIX Security Symposium—vol. 8, USA, Aug. 1999.

I. Mackie and M. Yldirim, "A Novel Hybrid Password Authentication Scheme Based on Text and Image: 32nd Annual IFIP WG 11.3 Conference, DBSec 2018, Bergamo, Italy, Jul. 16-18, 2018, Proceedings," 2018, doi: 10.1007/978-3-319-95729-6_12.

L. Sobrado and J.-C. Birget, "Graphical passwords," Rutger Sch., vol. 4, Sep. 2002, Accessed: Feb. 19, 2022. [Online]. Available: rutgersscholar.libraries.rutgers.edu/index.php/scholar/article/view/60.

M. Rao, C. Pravallika, G. Priyanka, and M. Kumar, "A Shoulder-Surfing Resistant Graphical Password Authentication Scheme," University of Guntur, Andhra Pradesh, India, Mar. 2016, pp. 105-112. doi: 10.1007/978-981-10-0419-3_13.

R. Dhamija and A. Perrig, "De'ja' Vu: A User Study Using Images for Authentication" IMS/CS University of California Berkeley, Oct. 2008.

S. Hamid and N. Bawany, "AcSIS: Authentication System Based on Image Splicing," Eng. Technol. Appl. Sci. Res., vol. 9, pp. 4808-4812, Oct. 2019, doi: 10.48084/etasr.3060.

S. Man, D. Hong, and M. Matthews, "A Shoulder-Surfing Resistant Graphical Password Scheme—WIW.," vol. 3., University of South Carolina, Jan. 2003.

T. Yamamoto, Y. Kojima, and M. Nishigaki, "A Shoulder-Surfing-Resistant Image-Based Authentication System with Temporal Indirect Image Selection.," Shizuoka University, Hamamatsu Japan, Jan. 2009.

W. Luo, B. Lan, X. Wan, Z. Liu, Y. Zeng, and J. Ma, "Feel Vibration: Challenge-Response Mobile Authentication with Covert Channel," Xidian University, China, Oct. 2020, pp. 1089-1096. doi: 10.1109/ICCT50939.2020.9295824.

X. Suo, Y. Zhu, and G. Owen, "Graphical Passwords: A Survey.," Jan. 2005, doi: 10.1109/CSAC.2005.27.

* cited by examiner

VIBRATION AIDED PICTURE-BASED AUTHENTICATION SYSTEM AND METHOD

BACKGROUND OF THE INVENTION

Technical Field

Embodiments of the subject matter disclosed herein generally relate to an authentication method for logging into an information technology system, and more particularly, to a system and method that use an image-based authentication method enhanced with a vibration procedure for logging into the information technology system.

Discussion of the Background

Nowadays, most smart device users access services and other applications through digital channels, i.e., using a wired or wireless connection to a remote information technology system (service provider). Accessing these services invariably requires the user to log in into an account, hosted by the information technology system. Besides the myriads of online security threats and risks associated with logging into a remote account, there is also the risk that an attacker physically observes the username and password that the user is inputting into his or her device. This may happen, for example, when the user and the attacker are sitting next to each other in a public place, e.g., restaurant, movie theater, airplane, train, etc. This specific physical threat/attack is known under the name of "shoulder attack," as the attacker is sitting shoulder to shoulder next to the user.

One of the traditional authentication method is an image password authentication, which is an easy-to-use method. This method is widely used in different applications. However, the image password authentication method is prone to shoulder attacks, in which an attacker can snoop and see the locations of the secret spots on the user's screen. This is undesirable in situations when traveling in airplanes or other public transportation methods where shoulder surfing cannot be prevented.

Image password systems (also known as graphical passwords) have been developed in the past to simplify the user authentication process. The two main schemes used in those systems are recognition-based and recall-based. In recognition-based systems, the user chooses an image from a displayed set of images during a registration phase, and then the user is asked to choose the same image each time the user logs in for the authentication process.

The recall-based systems usually require the users to create something (usually a drawing) during the registration phase, and then, during the authentication phase, to recall the drawing (see [1]). Some of the first recall-based graphical schemes were developed in the 90s and are considered the foundation of many recent graphical systems. Initially the recall-based graphical scheme used for authentication required (see [2]) the users to register by clicking on different locations on an image. To get authenticated, the user needs to click on the approximate areas of these locations. Another system was later developed by [3] and this system required the users to use their own signatures entered via a mouse as their password image. The system will ask the users to redraw their signatures during the authentication phase and verify their identity using geometric average means and a dynamic update of the database. A later authentication scheme introduced by [4] required the users to draw their password on a 2D grid canvas during the registration phase. The coordinates of the grids that contain the drawn password image were stored in order and checked during the authentication phase.

One of the first attempts at recognition-based graphical schemes was proposed by [5] and required the users to select their password images among a set of random images that are generated by a program. The results of this approach showed that 90% of participants were able to successfully log in using the proposed system, while only 70% succeeded using text-based passwords. Thus, another scheme introduced by [6] requested the users to select password images that have several variants, where each one is assigned a unique code, and the users needed to memorize and write down the codes of the password images that are displayed on the screen along with the code of their relative location during the authentication stage.

As the use of web-based applications in mobile devices has become a part of life in recent years, different improved graphical authentication schemes have been proposed based on the older schemes mentioned above. These schemes aim to benefit from the picture's superiority effect, and to solve the issues of previous methods. For example, one group proposed in [7] an authentication scheme that solved the mobile devices compatibility issue by using 12 image objects in 3 stages instead of the huge pool of images used by the older schemes. The mobile device is configured to convey hidden messages during the authentication process to ensure security by requiring the user to select 6 image objects out of 12 based on observation of the hidden signals chosen in the registration stage. The objects with the hidden signals are, for example, Pass object, Flag object, and Skipping object. The Pass objects are the actual images that form the graphical password, while the existence of a Flag object during the authentication process will require the user to select one pass object and 5 other random images that are not the pass objects. Finally, a Skipping object will require the user to select it along with the other 5 Pass objects. This scheme improves the probability of overcoming shoulder surfing attacks. However, the authentication process is cumbersome, especially for older people, as it has a learning curve at each stage that may confuse the user when Flag objects or Skipping objects show up on the screen.

Another group proposed in [8] a scheme in which the user is required to upload 5 images, then the system will divide each one into 500 segments. Each segment is termed as a "Cue Point" that the user needs to select to create a unique pattern that is used for the authentication process. This system is not efficient for mobile devices as the use of 500 segments could be an issue in small screens, in addition to its vulnerability to shoulder surfing attacks.

Another group proposed in [9] the use of electroencephalography, which is a method for recording neuronal activity of the brain by using consumer grade headsets to detect if the users recognize 5 images out of 100 as their password. This scheme was developed to protect the users from shoulder surfing attacks since the users do not have to click anything on the screen. However, this solution is not practical as it requires additional hardware to be used each time the user tries to login, and the results of the study cannot be reliable since different people may respond differently to stimuli because pictures can have different meanings to individuals, thus eliciting different reactions from them.

Another group proposed in [10] an Indirect Image-Based Authentication (I-IBA) scheme in which the users need to find their password images among randomly arranged images on the screen and click on the region that contains the password image. The authentication process is completed once this task is repeated several times. An enhancement introduced by [11] to this scheme was also proposed in which the user needs to select a slide show that contains the password image. These schemes have a large cognitive load, and the use of large pools of images is not suitable for small screens or for people that might have difficulty remembering things.

Yet another group introduced in [12] a system called ColorLogin where the system challenges the user in each login in R rounds (the rounds are chosen based on the preferred security level), and each round provides random images in different color categories to confuse onlookers. The users need to click on the line that contains their password image in order to be authenticated. Schemes that use large pools of images and icons that are displayed at once are predictable as they create hotspots where some icons are more popular among users, and the use of image background colors is not inclusive to color-blind individuals who may have issues during the authentication process.

More recently, a group proposed in [13] a hybrid system that uses both images and text for the authentication process. The users will need to enter a text-based password called "key password" along with another complex text-based password that is associated with different images from a displayed portfolio. This portfolio contains images of objects and people whose names' initials are the same as the first digit of the key password. The main goal of this hybrid system is to help the users remember the complex string and reduce phishing attacks as it becomes difficult to give information about the chosen images even if their first text-based password was obtained.

Another group [14] proposed a system that uses visual cryptography to generate two images of the user ID, one image is stored in the server and the other is sent to the user to be uploaded during the authentication state. In the next authentication stage, the user is presented with a 5×5 distorted image grid to select password images. The main issue with this system is the lengthy authentication process.

The authors of [15] proposed an interface that contains a 10×10 grid with 94 characters. The users can choose a password with at least four characters from the given 94 characters, which are distributed randomly, and the users need to type or click their password in this grid. The chosen pass-characters are processed as pairs, and each pair is processed separately, using predetermined rules. The suggested scheme is resistant to shoulder surfing attacks and brute force attacks. If an adversary exceeds the login attempts, the interface changes the random order of characters. However, there may be usability issues since the users need to memorize the predetermined rules in order to enter their correct passwords, and the system may not be suitable for use on mobile devices with small screens due to the difficulty of displaying the 10×10 grid.

A system that is a combination of recognition and recall based approach was proposed in [16]. In this system, the user is required to answer secret questions in addition to a picture password that contains a session password. The session password is the intersection of the user selected picture password, during registration, which is displayed randomly at every login in a grid style that contains other pictures. The main drawback of this system is that it does not allow an odd number of secret positions as well as it requires effort and time during the login process.

The authors in [17] proposed a PIN authentication system that prevents shoulder surfing attacks in public places by using a challenge-response scheme. User authentication is done by communicating secrets using vibration feedback. The user first sends a request to access the system, the system then replies with a challenge to the user through vibration, and then the user inputs the response of the challenge. This solution was developed to protect a device PIN from shoulder surfing attacks since the PIN is a widely used local device password that usually comprises 4 or 6 digits. However, this scheme is not safe against malware since an attacker can obtain the sensor data by installing a malicious application on the device. Additionally, this system affects the usability of the device as the users need to know Morse code for the used alphabet.

Thus, there is a need for an authentication method that is not vulnerable to a shoulder attack and is also easy to be used, without the need of memorizing a substantial amount of data.

SUMMARY OF THE INVENTION

According to an embodiment, there is a method performed by a server for authentication at a service provider, and the method includes generating a sequence X of secret locations $SL_n$ and deceiving locations $DL_k$ associated with an image, wherein the deceiving locations $DL_k$ are associated with a random array $V_i$ of vibrations pattern, wherein i, n, and k are integers with k smaller than n, and granting access to an electronic device to the server when taps received from the electronic device, and associated with the secret locations $SL_n$ and the deceiving locations $DL_k$, correspond to the sequence X. Each vibration of the random array $V_i$ of vibrations pattern is associated with a corresponding deceiving location $DL_k$.

According to another embodiment, there is a method performed by an electronic device of a user for being authenticating on a server, the method including transmitting a user identification (ID) to the server for starting an authentication procedure, receiving an image from the server, detecting a first tapping corresponding to a secret location $SL_n$, on the image, when there is no vibration applied by the smartphone prior to the first tapping, detecting a second tapping corresponding to a deceiving location $DL_k$, on the image, when there is a vibration applied by the smartphone prior to the second tapping, and transmitting the first and second tapings to the server.

According to still another embodiment, there is a server of a service provider that includes an interface for receiving information from an electronic device of a user, and a processor connected to the interface. The processor is configured to generate a sequence X of secret locations $SL_n$ and deceiving locations $DL_k$ associated with an image, where the deceiving locations $DL_k$ are associated with a random array $V_i$ of vibrations pattern, wherein i, n, and k are integers with k smaller than n, and to grant to the electronic device access to the server when taps received from the electronic device, and associated with the secret locations $SL_n$ and the deceiving locations $DL_k$, correspond to the sequence X. Each vibration of the random array $V_i$ of vibrations pattern is associated with a corresponding deceiving location $DL_k$.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a user that uses a smartphone for logging into a secure site. However, the embodiments to be discussed next are not limited to a smartphone, but may be applied to other devices, for example, a tablet, a personal computer, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a method for enhancing a security mechanism for a wired or wireless communication between a user's electronic device (e.g., a smartphone) and a service provider (e.g., server of a financial institution, online buying outlet, third-party provider, essentially any service provider) adds a new layer of security to an existing image-based authentication method by adding one or more deceiving locations (in addition to secret locations that constitute the password) on an image associated with the secret locations, and an associated vibration sequence for triggering the tapping of the deceiving locations. This method and associated device are now discussed in more detail with regard to the figures.

Figure 1:
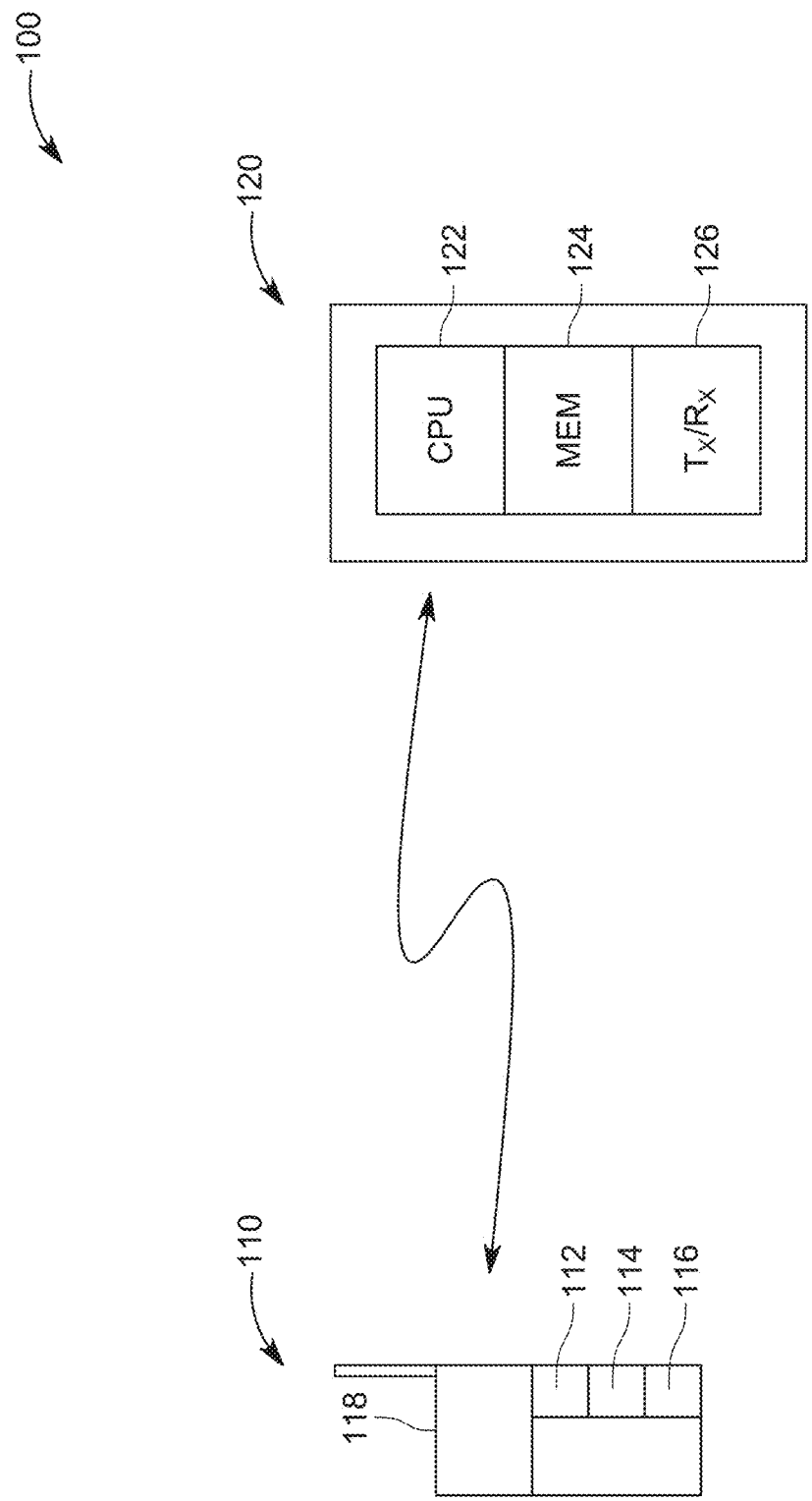
FIG. 1 is a schematic diagram of an authentication system including a service provider infrastructure and a user communication smartphone.

The shoulder-attack resistant method introduced above requires a registration phase, between an electronic device 110 (a smartphone in the following embodiments) of the user and a server 120 of the service provider, which are schematically illustrated in FIG. 1 as system 100. The registration phase takes place prior to the user accessing the services provided by the service provider. FIG. 1 illustrates the smartphone 110 having at least a processor 112 for processing data, a memory 114 for storing the data and rules implemented during the authentication phase, and a transceiver 116 for communicating with the server 120. The server 120, similarly to the smartphone 110, includes at least a processor 122, a memory 124, and a transceiver 126. One skilled in the art would understand that each of the smartphone and server may include other components, for example, a screen 118, keyboard for inputting information, a speaker for receiving voice commands, a microphone for input voice commands, etc.

Figure 2:
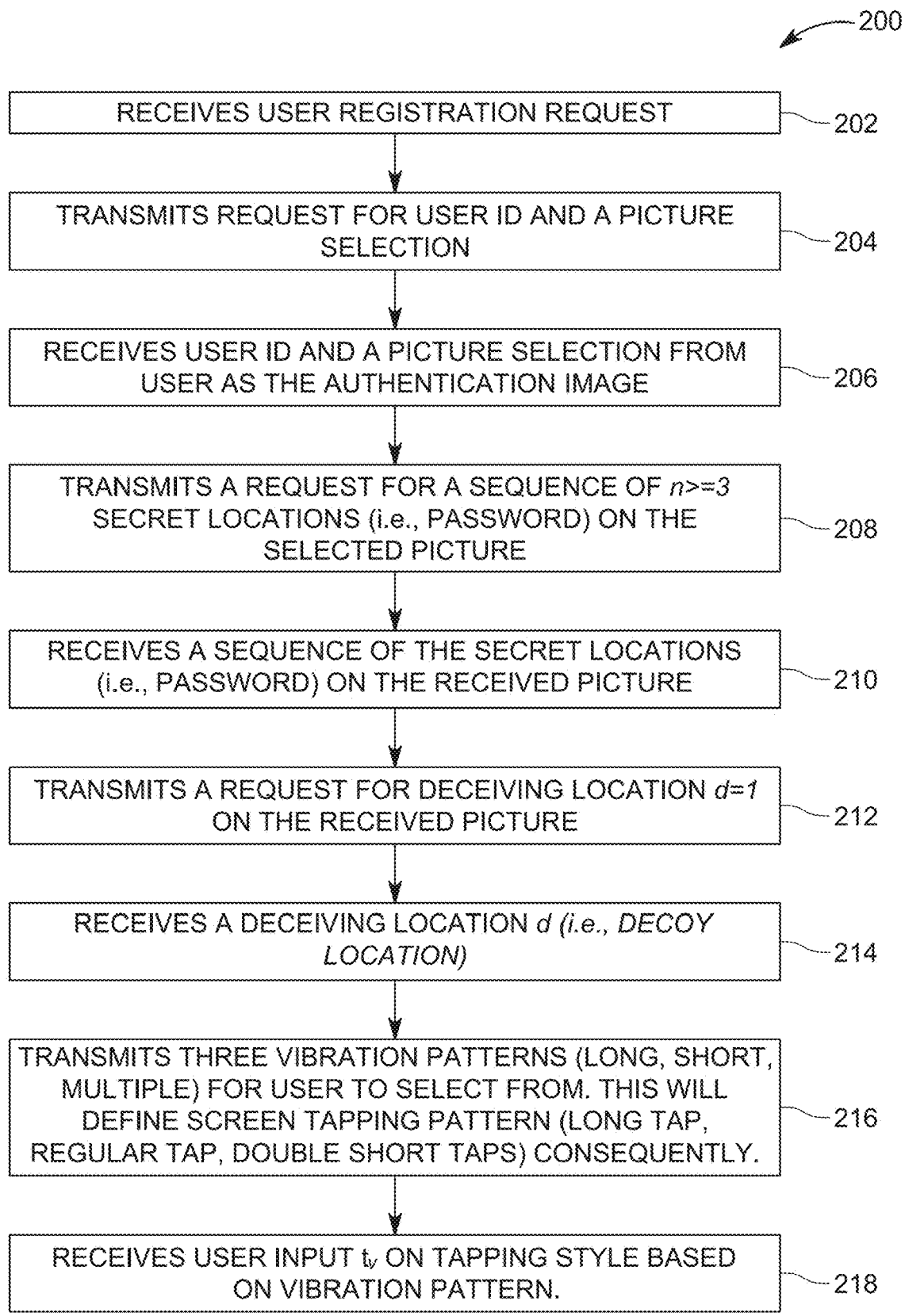
FIG. 2 is a flowchart of a method performed by the service provider for registering the smartphone of the user using a combination of secret and deceiving locations in an image and a vibration pattern associated with the deceiving locations.
Figure 3A:
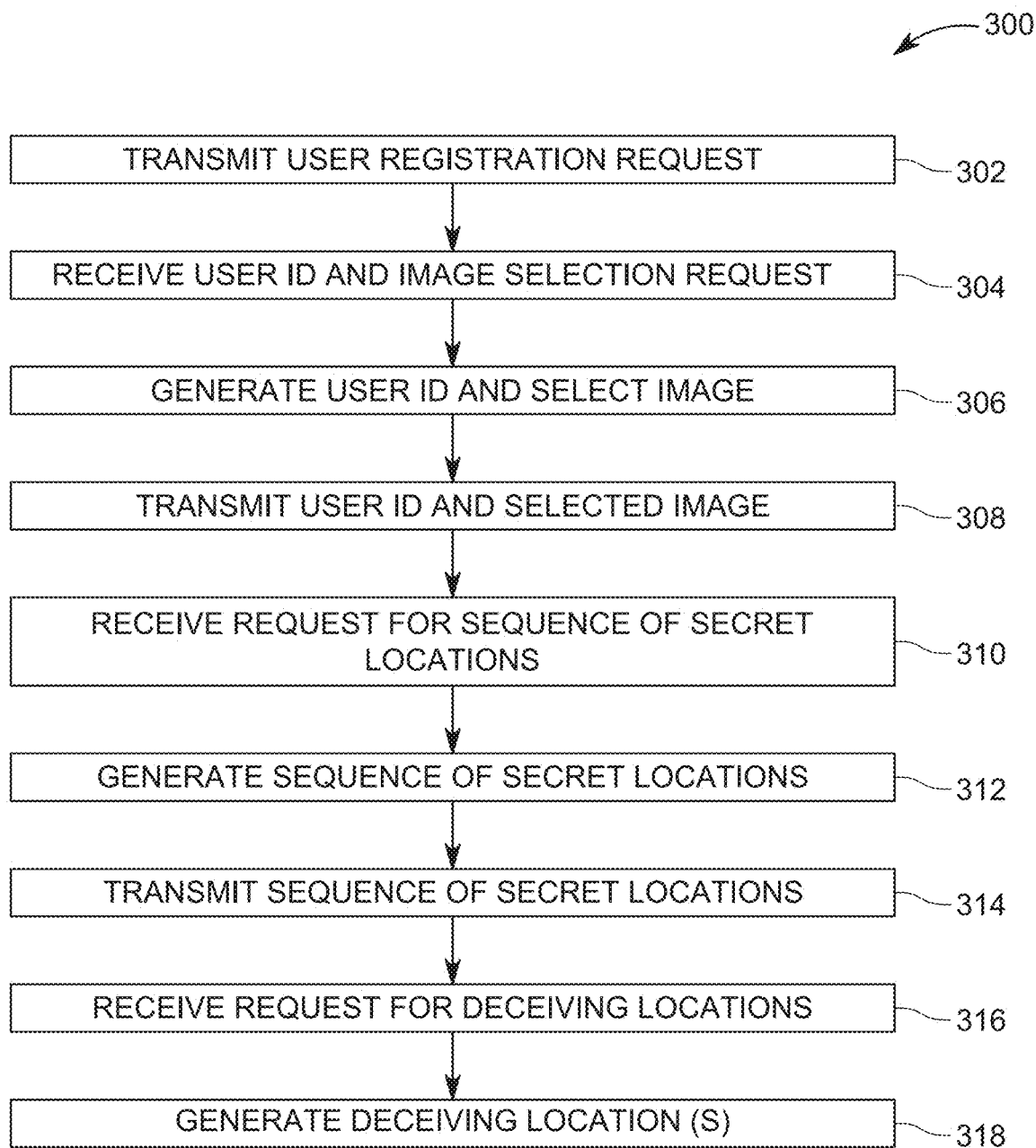
FIGS. 3A and 3B is a flowchart of a method performed by the smartphone for registering on the server of the service provider using a combination of secret and deceiving locations in an image and a vibration pattern associated with the deceiving locations.
Figure 3B:
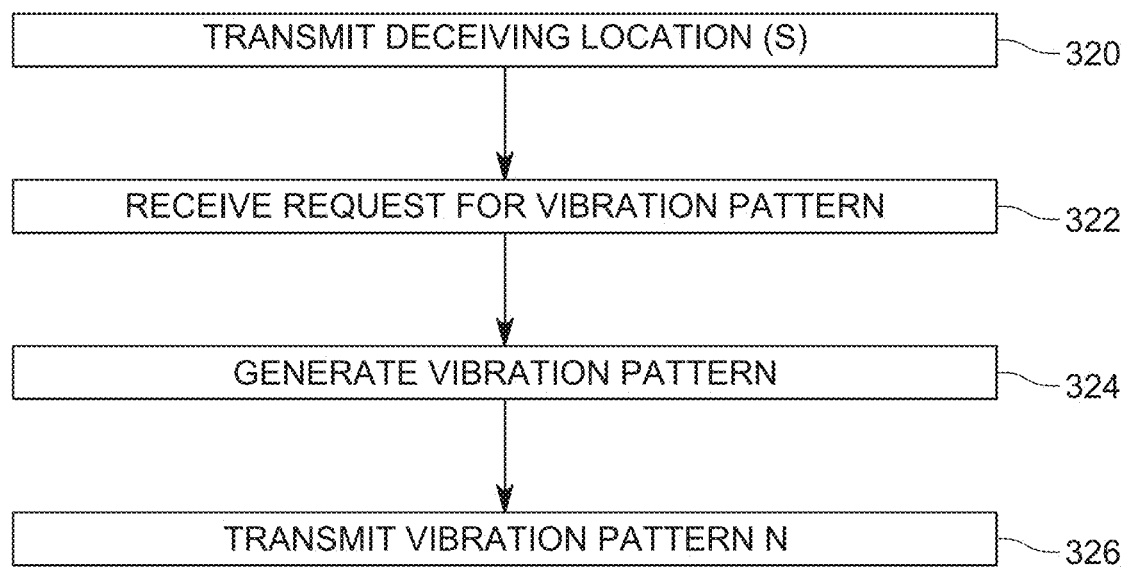

The registration phase between the smartphone 110 and the server 120 is schematically illustrated in the flowchart of FIG. 2, from the point of view of the server 120. FIG. 3 presents the registration phase from the point of view of the smartphone 110. Turning to FIGS. 2 and 3, the user of the smartphone 110 transmits in step 302, to the server 120, a request for registration, as illustrated in the method 300 shown in FIG. 3. The server 120 receives in step 202 of the method 200, illustrated in FIG. 2, the user registration request from the smartphone 110. The user of the smartphone is trying to establish, for example, an account with the service provider that owns the server 120. The server 120 then transmits in step 204, to the smartphone 110, a request to input a user ID (i.e., username or email) and to make an image selection. This information may be displayed on the smartphone's screen 118. The user receives the user ID and image selection request in step 304 and generates, in step 306, the user ID and selects an image to be used for inputting the password. In one embodiment, the server 120 sends a group of images to the user and the user selects one of those images. In another embodiment, the user selects an image from its own database, for example, a personalized image. Then, in step 308, the user transmits the generated user ID and the selected image to the server 120. This step corresponds to step 206 in FIG. 2, in which the server 120 receives from the user, the generated user ID and the selected image.

Figure 4:
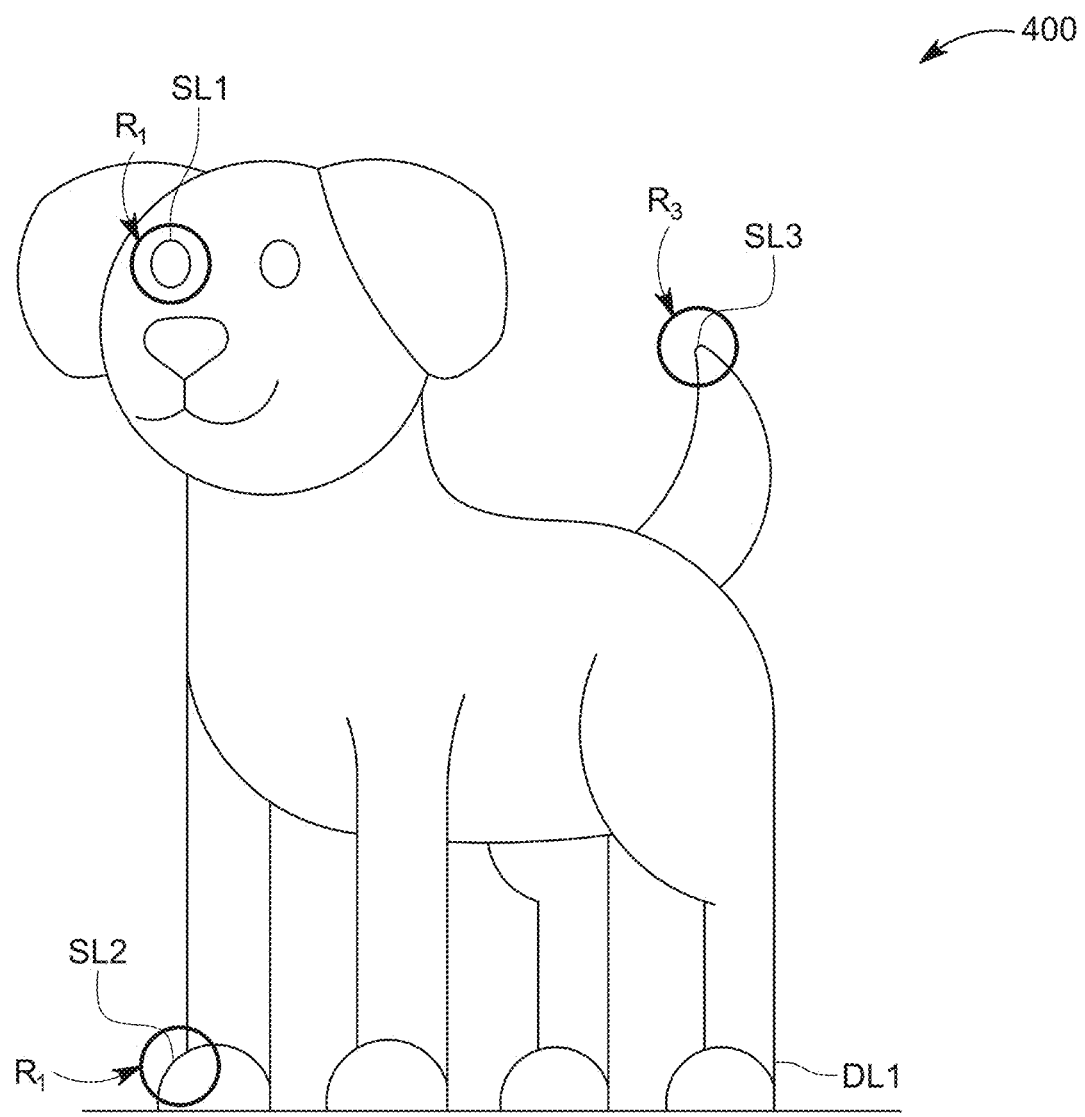
FIG. 4 illustrates an example image used by the smartphone and server to choose the secret and deceiving locations according to an embodiment.

Next, the server 120 transmits in step 208, and the smartphone 110 receives in step 310, a request for a sequence of n secret locations $SL_n$ on the selected image, where n is an integer equal to or larger than 3. The selection of the secret locations $SL_n$ constitutes the password to be used by the user when logging into the server 120. Thus, the order of the secret locations (when input on the selected image) is the password of the user. The user selects in step 312 the secret locations $SL_n$, as schematically illustrated in FIG. 4, thus generating the sequence of secret locations $SL_n$. Note that each secret location $SL_n$ is associated with a given region Rn on the image 400. As long as the user taps with his or her finger the region Rn, the smart phone associates that region with a corresponding secret location $SL_n$ and generates a signal indicative of that location. The size of the region Rn may be preconfigured or selected by the user during the registration phase. FIG. 4 schematically illustrates a selected image 400 of a dog and three secret locations $SL_1$ to $SL_3$ (an eye, a paw, and the tip of the tail of the dog). When selecting the secret locations, the order of the secret locations $SL_1$ to $SL_3$ is also a factor, as the server will recognize the three locations only if introduced in the selected order. Thus, the sequence of secret locations $SL_n$ is characterized by two factors, the physical locations of the $SL_n$ in the selected image, and the order in which these physical locations need to be tapped by the user. The smartphone 110 transmits in step 314 the sequence of physical locations to the server 120, and the server receives in step 210 the sequence of physical locations.

Next, the server 120 transmits in step 212, to the smartphone 110, a request for deceiving locations $DL_k$ on the selected image 400, where k is equal to 1 or larger. The smartphone 110 receives in step 316 the request for the deceiving locations $DL_k$ and generates in step 318 at least one deceiving location $DL_1$, as schematically illustrated in FIG. 4. The deceiving location $DL_1$ may be located anywhere in the image 400, even on top of a secret locations $SL_n$. In one embodiment, although tapping the deceiving location on the selected image 400 is required, the deceiving location is not part of the password (i.e., the order set of secret locations). Then, the smartphone 110 transmits in step 320 the selected deceiving location $DL_1$ to the server 120 and the server receives in step 214 the deceiving location $DL_1$.

The server 120 transmits in step 216, to the smartphone 110, a request for selecting a vibration pattern from a set of vibration patterns. The selection of vibration patterns may include a long, short, and multiple vibrations. The smartphone, when receiving a specific vibration pattern, will prompt the user to tap the screen of the phone, on the image 400, at the deceiving locations $DL_k$, with a specific tap corresponding to the selected vibration (e.g., short tap, long top, multiple tap). For example, the long vibration of the smartphone prompts the user to apply a long tap on a deceiving location. The same is true for the short or multiple vibration patterns, i.e., they require a short or multiple tapping in response to the vibration. In other words, a time duration of the vibration is proportional to a time duration of the tap for each set of vibration patterns. The smartphone 110 receives in step 322 the request for the vibration patterns, the user selects in step 324 the vibration patterns, and the smartphone transmits in step 326 the vibration patterns to the server 120. As noted above, a vibration pattern defines an action required by the user when performing an authentication phase based on the selected image 400. The user will need to remember, that in response to the vibration pattern performed by the smartphone, to tap the screen 118 of the smartphone 110, on the deceiving locations $DL_k$, consistent with the selected vibration pattern, e.g., long tap for long vibration, short tap for short vibration, double short tap for double short vibrations, double long tap for double long vibrations, etc.

In one embodiment, a short tap is defined by a time period of about 1 ms or less while a long tap is defined by a time period larger than 1 ms. The value of 1 ms may be replaced by other values. In one embodiment, the user has the freedom to choose this value according to his or her needs. In this or another embodiment, the user may select a tapping style for each individual deceiving point $DL_k$, if more than one deceiving point is selected. It is noted that the tapping or the phone gesture or the user gesture may be subtle enough that the shoulder attacker cannot figure them out or simply cannot perceive them. The tapping style is received by the server 120 in step 218 and this step completes the registration phase for the user of the smartphone 110.

Figure 5:
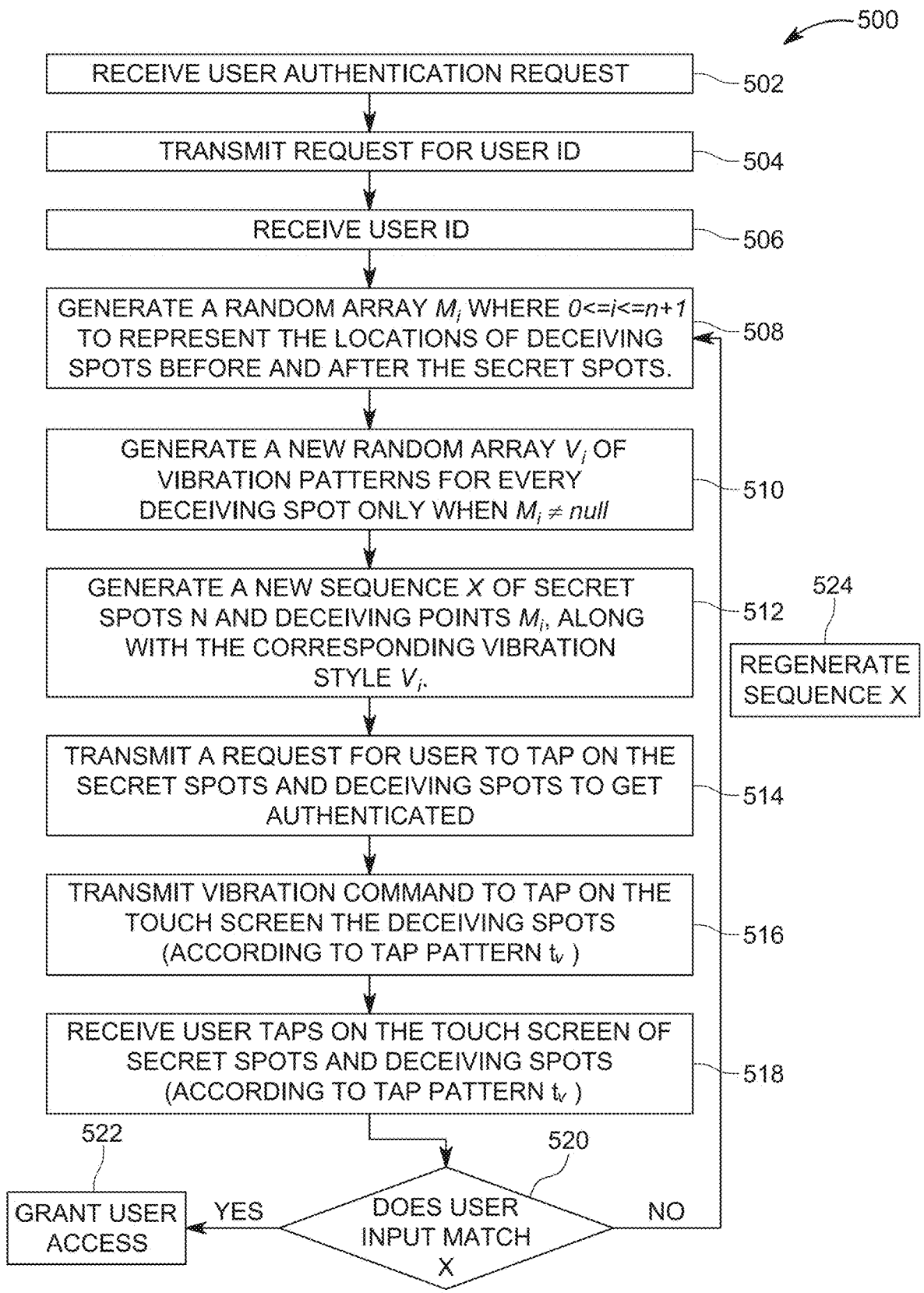
FIG. 5 is a flowchart of a method performed by the service provider for authenticating the smartphone of the user using a combination of secret and deceiving locations in an image and a vibration pattern associated with the deceiving locations.
Figure 6:
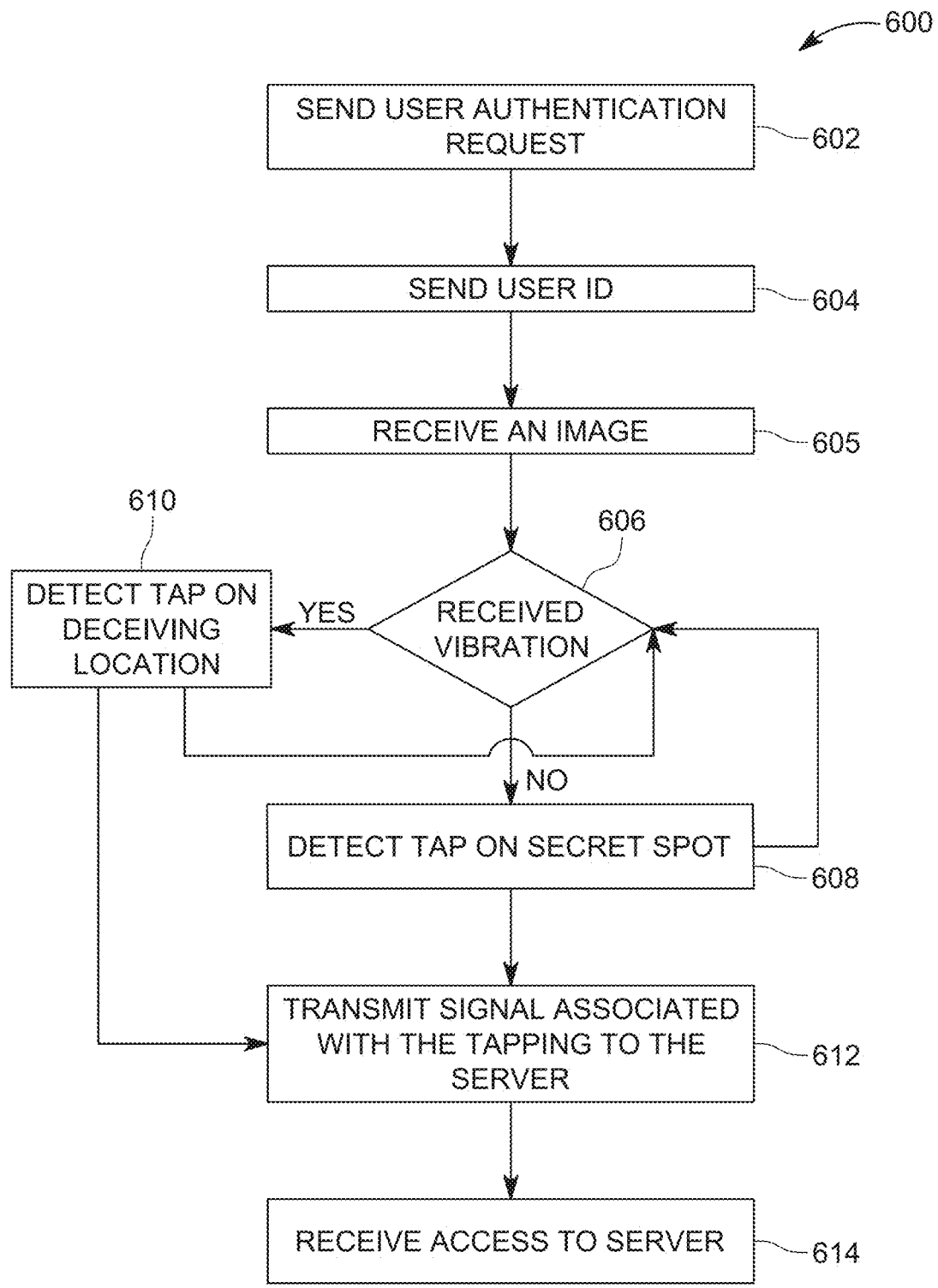
FIG. 6 is a flowchart of a method performed by the smartphone for becoming authenticated on the server, by using a combination of secret and deceiving locations in an image and a vibration pattern associated with the deceiving locations.

Next, the authentication phase is discussed with regard to FIGS. 5 and 6, which illustrate the steps performed by the server 120 and the smartphone 110, respectively. The method 500 of FIG. 5 shows the server 120 receiving in step 502 a user authentication request from the smartphone 110. This corresponds to step 602 of method 600, in which the user sends the authentication request to the server 120. The server 120 transmits, in step 504, a request to the smartphone 110, for producing the user ID which was generated in the registration phase discussed above with regard to FIGS. 2, 3A, and 3B. The user enters the user ID, in step 604, into the smartphone 110, and the smartphone 110 sends the user ID to the server 120. The server 120 receives in step 506 the user ID.

Figure 7:
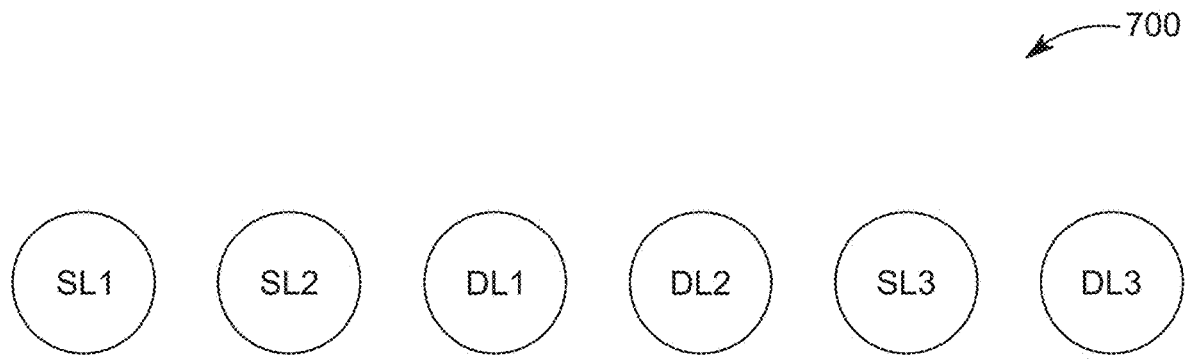
FIG. 7 schematically illustrates a sequence of secret and deceiving locations to be used by the smartphone and server for authentication.

If the user ID is found in a database associated with the server 120, the server 120 generates in step 508 a random array $M_i$ of deceiving locations $DL_k$, where "k" is any integer different from zero, and "k" is larger than zero and smaller than the n/2, where n is the number of secret locations $SL_n$. This means that, in this embodiment, the number of deceiving locations $DL_k$ is smaller than half the number of secret locations $SL_n$. In one embodiment, the n/2 may be replaced with another number, smaller than n. Considering that the user selected three secret locations $SL_1$ to $SL_3$ for the password and three deceiving locations $DL_1$ to $DL_3$ during the registration phase, a random array $M_i$ 700 of deceiving locations may be $SL_1, SL_2, DL_1, DL_2, SL_3,$ and $DL_3$, as schematically illustrated in FIG. 7. Another random array $M_i$ of deceiving locations may be $SL_1, DL_2, SL_2, DL_1, DL_3,$ and $SL_3$. Those skilled in the art would understand that there is a large number of arrays $M_i$ that can be generated based on the secret locations $SL_n$ and the deceiving points $DL_k$. Note that the first and last locations in the random array $M_i$ may be any of the secret and deceiving points.

Figure 8:
FIG. 8 schematically illustrates a sequence of vibration patterns to be used by the server to prompt the user to enter the deceiving locations while also entering the secret locations.

The server 120 further generates, in step 510, a (new) random array $V_i$ of vibration patterns (styles) for the deceiving points $DL_k$ of the generated random array $M_i$, when the array $M_i$ is different from zero. The random array $V_i$ is generated for each random array $M_i$. The random array $V_i$ includes a vibration pattern, selected by the user during the registration phase. A vibration pattern 800, in one example, may include a first short vibration for triggering the first deceiving location $DL_1$, a second long vibration for the second deceiving location $DL_2$, and a third short vibration for the third deceiving location $DL_3$, as schematically illustrated in FIG. 8. Note that in one embodiment, a vibration pattern is associated with the corresponding deceiving locations. This means that each vibration pattern prompts the user to select a deceiving location, and the tapping style of the deceiving location should match the vibration pattern.

Figure 9:
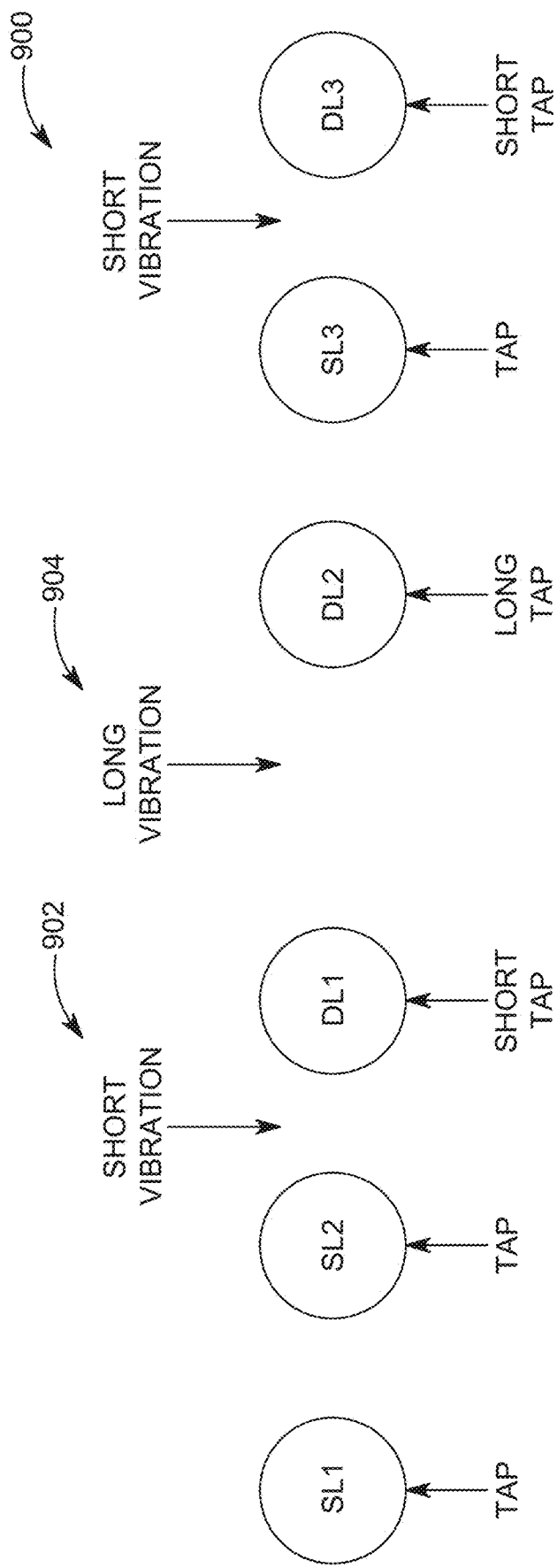
FIG. 9 schematically illustrates a sequence of secret and deceiving locations and vibration patterns associated with the deceiving locations, to be used by the user on the smartphone for authentication on the server.
Figure 10:
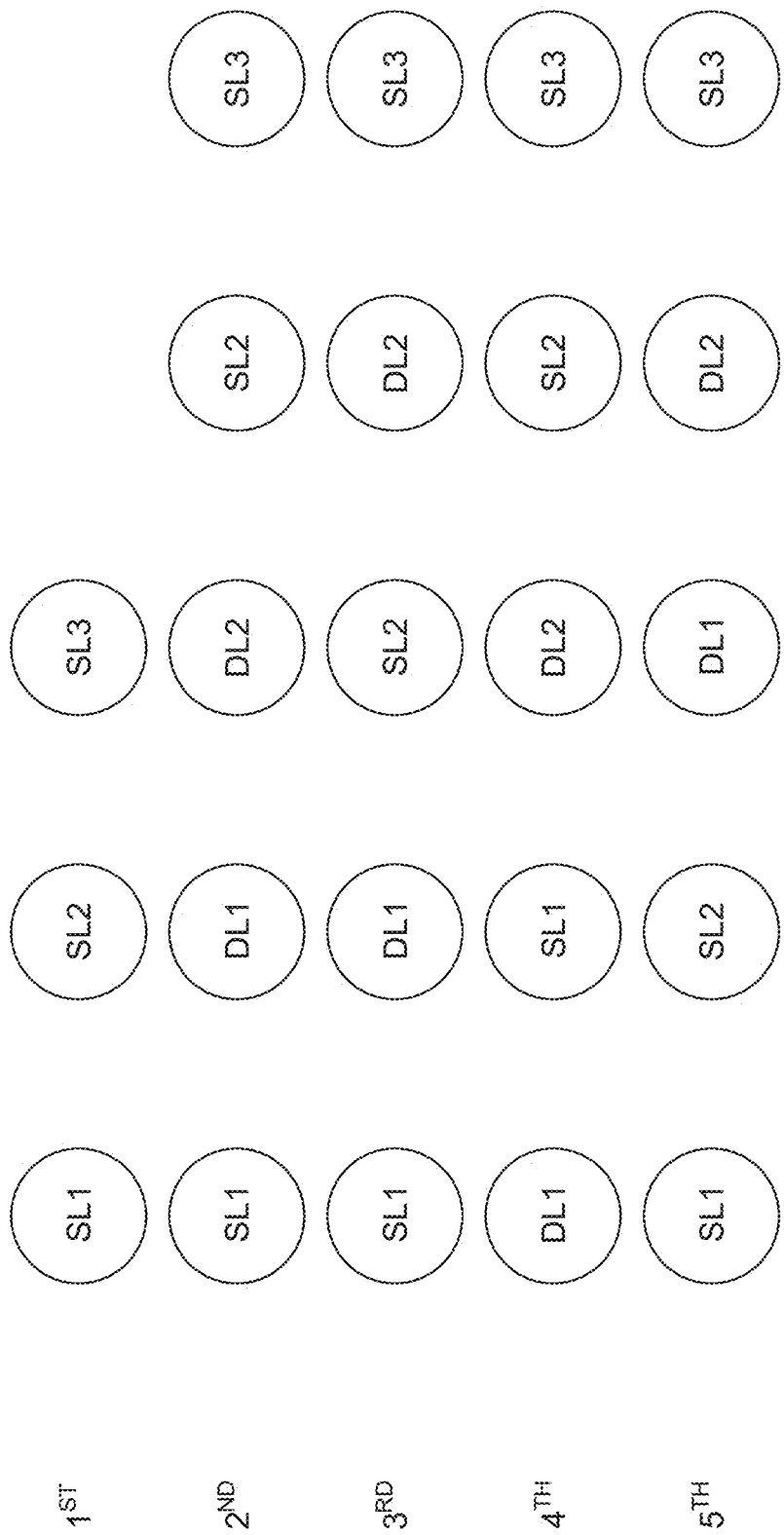
FIG. 10 schematically illustrates various combinations of secret and deceiving locations that can be generated by the server for authenticating the smartphone.

The server 120 then generates in step 512, a new sequence X of secret locations $SL_n$ and deceiving locations $DL_k$ (corresponding to the random array $M_i$), along with a corresponding vibration style $V_i$, for example, as schematically illustrated in FIG. 9. The sequence X 900 is schematically illustrated in FIG. 9, and shows that each secret location $SL_n$ needs to be tapped by the user, while for the deceiving locations $DL_k$, the user will tap them only if a vibration 902 prompts the user to do so. If the vibration 902 is short, then the user needs to tap next a deceiving location $DL_1$, with a short tap. If the vibration 904 is long, the user needs to top next another deceiving location $DL_2$, with a long tap. Note that the user needs to tap all the secret locations $SL_1$ on the image 400 according to the order established during the registration phase. However, for the deceiving locations $DL_k$, the user taps a deceiving location only when the smartphone 110 generates a corresponding vibration (902 or 904), and the style of the tap needs to match the style of the vibration (i.e., short vibration, short tap, etc.). In this way, the attacker cannot see the vibrations produced by the phone, and does not know that the deceiving points are not secret locations. As the sequence X 900 is generated anew each time the user logs in into the server 120, it is practically impossible to infer the user's password through a shoulder attack. In this regard, FIG. 10 shows only a couple of possible sequences of secret locations $SL_n$ and deceiving locations $DL_k$, when n=3 and k=2. The sequence 900 (which essentially is the password corresponding to the user ID) can become more complicated as the number of secret and/or deceiving locations is increased.

Returning to the methods 500 and 600, the server 120 transmits in step 514, to the smartphone 110, a request (including the image 400) for tapping on the screen (on the image 400) the secret and deceiving locations to get authenticated. The smartphone receives the image 400 in step 605 and determines in step 606 whether a vibration command has been received from the server 120. If there was no vibration received, the user taps on the image 400, displayed on the screen of the smartphone 110, the secret locations in the order established during the registration phase (e.g., eye of the dog, front paw of the dog, and tip of the tail of the dog) and the smartphone detects in step 608 the tapping (e.g., first tap). However, as the user taps one secret location (e.g., $SL_1$), which is automatically transmitted to the server 120 in step 608, and prepares to tap the next secret location (e.g., $SL_2$), the server 120 may send a vibration instruction in step 516, to the smartphone 110, as prescribed by the new sequence X 900. Upon receiving the vibration instructions in step 606, from the server 120, the smartphone applies the vibration and the user determines that the smartphone vibrated, which prompts the user to tap a deceiving location $DL_k$ (second tap) and not the next expected secret locations $SL_n$. The smartphone detects in step 610 the tapping associated with the applied vibration. Then, the user taps a next secret location if no vibration of the phone is detected and taps a deceiving location if the phone vibrates. This tapping continues until the user has introduced all the preestablished secret and deceiving locations. The signals associated with the tapings of the secret and deceiving locations are transmitted by the smartphone 110 in step 612.

The tapings of the secret and deceiving locations are received by the server 120 in step 518 and these locations and the length of the tapings for the deceiving locations are compared to the sequence X generated in step 512. The server 120 determines in step 520 whether the locations are identical, and the tapings of the deceiving locations are correct. If the result is positive, the server grants access in step 522 to the user and the user can access the resources on the server in step 614. However, if the result of the determination step 520 is negative, the method may return to step 508, to generate another random array $M_i$, $V_i$, and sequence X to offer a new chance to the user to log in.

One or more advantages of the embodiments introduced above are now discussed. The discussed methods address the vulnerability of traditional picture password systems to shoulder surfing attacks, a common issue in public spaces like airplanes or public transport. By using vibrations from the smart device, it protects the locations of secret spots from being visually observed. While enhancing security, the image and vibration based authentication method retains the usability and convenience of picture passwords, avoiding the need for additional hardware or overly complex user actions. In one implementation, unlike previous systems that require memorizing additional codes, patterns, or rules, the authentication method of the embodiments discussed above simplifies the user interaction process while maintaining a high level of security. The method and associated system leverage the built-in vibrator sensor found in most modern smart devices, ensuring broad compatibility and eliminating the need for extra hardware. In one aspect, the vibration feedback mechanism integrates seamlessly into the authentication process, providing a tactile cue that enhances interaction and reduces the risk of errors By introducing deceptive and secret spots alongside the vibration feedback, the method minimizes the likelihood of "hotspots" (commonly used areas on an image), reducing predictability for attackers. Many earlier picture password systems were ineffective on small screens or required cumbersome actions like analyzing large grids. The method discussed above adapts effectively to the constraints of small screens. The combination of visual (image), tactile (vibration), and cognitive (deceiving spots) elements in the above method creates a multi-modal authentication system that is novel in the field.

Unlike static image-based systems where "hotspots" on images can make passwords predictable, the vibration feedback dynamically changes how users interact with the system, reducing predictability. The use of deceiving spots adds an extra layer of unpredictability to the authentication method. The combination of image selection, secret locations selection, vibration patterns selection, and deceiving locations selection significantly expands the possible password combinations, making it more resistant to brute-force attacks. Because the authentication method uses built-in vibration motors, commonly available gadgets with vibration motor such as smartphones, game console controller, smartwatch, fitness trackers, and headgears can be configured to use the method. This eliminates the need for additional hardware, reducing costs and simplifying deployment. The system can be adapted for various applications, including secure logins, PIN entry, and device unlocking. Its versatility extends to both consumer and enterprise use cases, making it highly adaptable to various scenarios. The method allows the user to adapt the vibration intensity, frequency, or pattern based on user preferences, or environmental conditions, ensuring robust authentication in various scenarios.

By generating unique vibration patterns for each authentication session, the method prevents replay attacks and ensures that even if cues are observed, they cannot be reused. The method is designed to accommodate varying levels of user familiarity with technology, offering an intuitive and accessible authentication mechanism while maintaining high security. This user-friendliness is maintained despite the significant security enhancements provided by the vibration feedback and deceiving locations. The ability for users to select their own images, secret locations, deceiving locations, and vibration patterns allows for a personalized authentication experience, potentially increasing user adoption and satisfaction.

Figure 11:
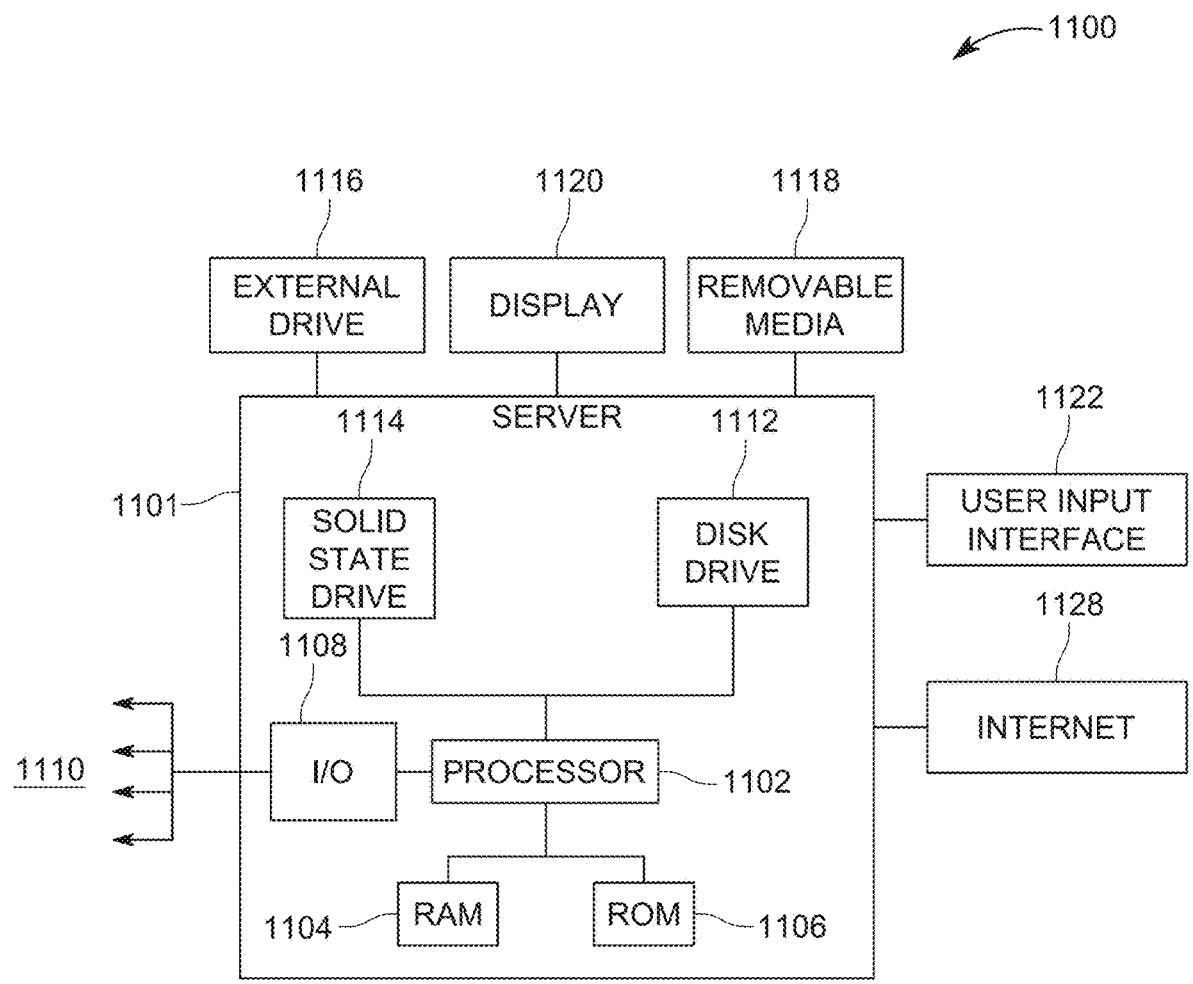
FIG. 11 is a schematic diagram of a server of the service provider or an electronic device of the user.

The above-discussed procedures and methods may be implemented in a computing device (e.g., server 120, mobile device 110, personal computer, IoT device, etc.) as illustrated in FIG. 11. Hardware, firmware, software or a combination thereof may be used to perform the various steps and operations described herein. The computing device 1100 is suitable for performing the activities described in the above embodiments and may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bus 1110 to provide control signals and the like. Processor 1102 carries out a variety of functions as are known in the art, as dictated by software and/or firmware instructions.

Server 1101 may also include one or more data storage devices, including hard drives 1112, solid-state drives 1114, and other hardware capable of reading and/or storing information, such as DVD, etc. In one embodiment, software for carrying out the above-discussed steps may be stored and distributed on a memory stick 1116, a solid state storage device 1118 or other form of media capable of portably storing information. These storage media may be inserted into, and read by, devices such as solid state drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as a database or any elements. The server may be part of a larger network configuration as in a global area network (GAN) such as the Internet 1128, which allows ultimate connection to various landline and/or mobile computing devices.

As described above, the apparatus 1100 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 1102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 1102 may be configured to execute instructions stored in the memory device 1104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The term "about" is used in this application to mean a variation of up to 20% of the parameter characterized by this term. It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a method and system for vibration aided, image-based authentication over the internet. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The entire content of all the publications listed herein is incorporated by reference in this patent application.

[1] X. Suo, Y. Zhu, and G. Owen, "Graphical Passwords: A Survey," January 2005, doi: 10.1109/CSAC.2005.27.

[2] G. E. Blonder, "Graphical password," U.S. Pat. No. 5,559,961A, Sep. 24, 1996 Accessed: Feb. 19, 2022. [Online]. Available at patents.google.com/patent/U.S. Pat. No. 5,559,961A/en

[3] A. Syukri, E. Okamoto, and M. Mambo, "A User Identification System Using Signature Written with Mouse," January 1998, pp. 403-414. doi: 10.1007/BFb0053751.

[4] I. Jermyn, A. Mayer, F. Monrose, M. K. Reiter, and A. D. Rubin, "The design and analysis of graphical passwords," in Proceedings of the 8th conference on USENIX Security Symposium—Volume 8, USA, August 1999.

[5] R. Dhamija and A. Perrig, "De'ja' Vu: A User Study Using Images for Authentication" October 2000.

[6] S. Man, D. Hong, and M. Matthews, "A Shoulder-Surfing Resistant Graphical Password Scheme—WIW," January 2003, vol. 3.

[7] G. W. Bin, S. Safdar, R. Akbar, and S. Subramanian, "Graphical authentication based on anti-shoulder surfing mechanism," in Proceedings of the 2nd International Conference on Future Networks and Distributed Systems, New York, NY, USA, June 2018, doi: 10.1145/3231053.3231073.

[8] S. Hamid and N. Bawany, "AcSIS: Authentication System Based on Image Splicing," Eng. Technol. Appl. Sci. Res., vol. 9, pp. 4808-4812, October 2019, doi: 10.48084/etasr.3060.

[9] F. Gondesen, M. Marx, and A.-C. Kycler, "A Shoulder-Surfing Resistant Image-Based Authentication Scheme with a Brain-Computer Interface," in 2019 International Conference on Cyberworlds (CW), October 2019, pp. 336-343. doi: 10.1109/CW.2019.00061.

[10] L. Sobrado and J.-C. Birget, "Graphical passwords," Rutger Sch., vol. 4, September 2002, Accessed: Feb. 19, 2022. [Online]. Available: rutgersscholar.libraries.rutgers.edu/index.php/scholar/article/view/60

[11] T. Yamamoto, Y. Kojima, and M. Nishigaki, "A Shoulder-Surfing-Resistant Image-Based Authentication System with Temporal Indirect Image Selection," January 2009.

[12] H. Gao, X. Liu, S. Wang, H. Liu, and R. Dai, "Design and Analysis of a Graphical Password Scheme," January 2010, doi: 10.1109/ICICIC.2009.158.

[13] I. Mackie and M. Yildirim, "A Novel Hybrid Password Authentication Scheme Based on Text and Image: 32nd Annual IFIP WG 11.3 Conference, DBSec 2018, Bergamo, Italy, Jul. 16-18, 2018, Proceedings," 2018, doi: 10.1007/978-3-319-95729-6_12.

[14] A. Vaddeti, D. Vidiyala, V. Puritipati, R. Ponnuru, J. Shin, and A. Reddy, "Graphical passwords: Behind the attainment of goals," Secur. Priv., vol. 3, July 2020, doi: 10.1002/spy2.125.

[15] M. Rao, C. Pravallika, G. Priyanka, and M. Kumar, "A Shoulder-Surfing Resistant Graphical Password Authentication Scheme," 2016, pp. 105-112. doi: 10.1007/978-981-10-0419-3_13.

[16] Mrs. A. S. Gokhale and V. S. Waghmare, "The Shoulder Surfing Resistant Graphical Password Authentication Technique," Procedia Comput. Sci., vol. 79, pp. 490-498, 2016, doi: 10.1016/j.procs.2016.03.063.

[17] W. Luo, B. Lan, X. Wan, Z. Liu, Y. Zeng, and J. Ma, "Feel Vibration: Challenge-Response Mobile Authentication with Covert Channel," October 2020, pp. 1089-1096. doi: 10.1109/ICCT50939.2020.9295824.

What is claimed is:

1. A method performed by a server for authentication at a service provider, the method comprising:
generating a sequence X of secret locations $SL_n$ and deceiving locations $DL_k$ associated with an image, wherein the deceiving locations $DL_k$ correspond to a random array $V_i$ of vibrations pattern, wherein i, n, and k are integers with k smaller than n; and
granting, to an electronic device, access to the server when taps received from the electronic device include the secret locations $SL_n$ and selected deceiving locations among the deceiving locations $DL_k$ corresponding to the sequence X,
wherein each vibration of the random array $V_i$ of vibrations pattern corresponds to one among the selected deceiving locations $DL_k$.

2. The method of claim 1, wherein each vibration is associated with a tap style for the associated deceiving location $DL_k$.

3. The method of claim 2, wherein the vibration has a time duration proportional to a duration of the corresponding tap.

4. The method of claim 1, wherein the secret locations $SL_n$ are selected by the user during a registration procedure, and are located on the image.

5. The method of claim 4, wherein the deceiving locations $DL_k$ are selected by the user during a registration procedure, and are located on the image.

6. The method of claim 1, further comprising:
generating, in response to receiving a user identity from the user, a random array $M_i$ including the secret locations $SL_n$ and the deceiving location $DL_k$, wherein the deceiving locations $DL_k$ are injected among the secret locations $SL_n$;
generating the random array $V_i$ of the vibration patterns; and
generating the sequence X based on the random array $M_i$ and the random array $V_i$.

7. The method of claim 6, wherein the random array $M_i$ starts with a secret location or a deceiving location.

8. The method of claim 1, wherein only the deceiving locations are associated with the random array of $V_i$ of vibrations pattern.

9. The method of claim 1, wherein the random array $V_i$ of vibrations pattern includes one or more of a short vibration, a long vibration, and a multiple vibration.

10. The method of claim 1, further comprising:
transmitting to the user a request for tapping the secret locations; and transmitting to the user, a vibration of the random array $V_i$ of vibrations pattern, for triggering a tapping of a corresponding deceiving location.

11. A server of a service provider comprising:

an interface for receiving information from an electronic device of a user; and a processor connected to the interface and configured to, generate a sequence X of secret locations $SL_n$ and deceiving locations $DL_k$ associated with an image, wherein the deceiving locations $DL_k$ correspond to a random array $V_i$ of vibrations pattern, wherein i, n, and k are integers with k smaller than n; and grant to the electronic device access to the server when taps received from the electronic device include the secret locations $SL_n$ and selected deceiving locations among the deceiving locations $DL_k$ corresponding to the sequence X, wherein each vibration of the random array $V_i$ of vibrations pattern corresponds to one among the selected deceiving locations $DL_k$.

12. The server of claim 11, wherein each vibration is associated with a tap of the corresponding deceiving location $DL_k$.

* * * * *